(12) United States Patent
Hodrus

(10) Patent No.: US 8,892,322 B2
(45) Date of Patent: Nov. 18, 2014

(54) CLUTCH PARAMETERS

(75) Inventor: Erhard Hodrus, Karlsruhe (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 474 days.

(21) Appl. No.: 13/272,375

(22) Filed: Oct. 13, 2011

(65) Prior Publication Data

US 2013/0116902 A1 May 9, 2013

Related U.S. Application Data

(63) Continuation of application No. PCT/DE2010/000354, filed on Mar. 25, 2010.

(30) Foreign Application Priority Data

Apr. 17, 2009 (DE) .......................... 10 2009 017 557
Jun. 25, 2009 (DE) .......................... 10 2009 030 440

(51) Int. Cl.
*G06F 19/00* (2011.01)
*G01M 13/02* (2006.01)
*F16D 48/06* (2006.01)

(52) U.S. Cl.
CPC ..... *G01M 13/022* (2013.01); *F16D 2500/1045* (2013.01); *A61D 2500/50236* (2013.01); *F16D 48/06* (2013.01); *F16D 2500/50248* (2013.01); *F16D 2500/30402* (2013.01)
USPC .................................................. 701/67

(58) Field of Classification Search
USPC ........... 701/51, 55–59, 66, 67–68, 71, 80, 82, 701/90
See application file for complete search history.

(56) References Cited

U.S. PATENT DOCUMENTS

2004/0064232 A1* 4/2004 Eich et al. .................. 701/68
2005/0257632 A1 11/2005 Runde et al.

FOREIGN PATENT DOCUMENTS

| DE | 10201982 | 7/2002 |
| DE | 102006008755 | 8/2007 |
| EP | 2116736 | 11/2009 |

* cited by examiner

*Primary Examiner* — Kim T Nguyen
(74) *Attorney, Agent, or Firm* — Simpson & Simpson, PLLC

(57) ABSTRACT

A method of determining clutch parameters at the initial start of operation of a friction clutch in a motor vehicle comprising the steps of: in a first phase, moving the clutch from an open state into a closed state and into an open state again at a predetermined constant slip of the clutch and determining and storing the position of the clutch during the movement when predetermined clutch torque thresholds are reached; in a second phase, in a first step, determining a touch point, a position hysteresis, and a torque hysteresis from the determined positions; determining a preliminary friction coefficient; determining preliminary form factors; determining a final friction coefficient; and determining final form factors.

13 Claims, 3 Drawing Sheets

CLUTCH PARAMETERS

CROSS-REFERENCE TO RELATED APPLICATIONS

This application is filed under 35 U.S.C. §120 and §365(c) as a continuation of International Patent Application No. PCT/DE2010/000354 filed Mar. 25, 2010 which application claims priority from German Patent Application No. DE 10 2009 030 440.1 filed Jun. 25, 2009 and German Patent Application No. DE 10 2009 017 557.1 filed Apr. 17, 2009 which applications are incorporated herein by reference in their entireties.

FIELD OF THE INVENTION

The invention relates to a method and device for determining clutch parameters at the initial start of operation of a friction clutch in a motor vehicle.

BACKGROUND

Touch points, friction coefficients, form factors, and the two hysteresis factors are adapted for clutches using algorithms. Characteristic curve relations are used to evaluate torque as a function of the position and to determine the position as a function of the torque.

Only the touch point is determined at the initial start of operation, since the touch point is very slow to adapt and an erroneous touch point has a considerable effect in particular in start-up and shifting processes. For this purpose, a routine has been developed that allows the determination of the touch point both in the vehicle and on the test bench.

Once the touch point has been determined and stored in the EEprom memory, the assumption is made that the other parameters that had been initialized with standard values would adapt automatically due to the adaptations during operation.

Such an approach is possible for development vehicles; since a test bench may not always be available to take measurements of the clutch and since there will be no complaints if the vehicle is inconvenient to drive on the first few miles.

However, the problem is that once in serial production, the vehicle is expected to exhibit excellent driving properties from the first mile on. This can only be achieved if all parameters are determined as accurately as possible at the initial start of operation of the vehicle.

In accordance with the prior art, the torque that is transmittable from a clutch can be determined from the clutch position and the speed of the clutch actuator based on a characteristic curve that exhibits hysteresis. The characteristic curve exhibiting hysteresis is based on a simple nominal characteristic curve that is characterized using the following parameters:

Touch point: corresponds to the clutch position in which a torque of 5 Nm can be transmitted.

Friction coefficient: a scaling factor for modifying the gradient of the characteristic curve above the torque of the touch point.

Form factors: scaling factors for modifying the torque values at the nodes above the touch point.

To represent the hysteresis property, the characteristic line is influenced by two further factors:

Position hysteresis: represents a parallel displacement of the modified nominal characteristic curve in the direction of the position as a function of the speed of the clutch actuator.

Torque hysteresis: Superimposes a torque-dependent scaling to the parallel displacement of the modified nominal characteristic curve in the direction of the position. Thus a greater hysteresis width can be attained at higher torques.

BRIEF SUMMARY OF THE INVENTION

A method of determining clutch parameters at the initial start of operation of a friction clutch in a motor vehicle comprising the steps of: in a first phase, moving the clutch from an open state into a closed state and into an open state again at a predetermined constant slip of the clutch and determining and storing the position of the clutch during the movement when predetermined clutch torque thresholds are reached; in a second phase, in a first step, determining a touch point, a position hysteresis, and a torque hysteresis from the determined positions; determining a preliminary friction coefficient; determining preliminary form factors; determining a final friction coefficient; and determining final form factors.

A device including a control device for determining clutch parameters at an initial start of operation of a friction clutch in a motor vehicle, the control device arranged to: in a first phase, move the clutch from an open state to a closed state and back to an open state at a predetermined, constant slip of the clutch when a torque is transmitted and, during the movement, to determine and store the position of the clutch when a predetermined clutch torque threshold is reached; in a second phase, determine a touch point, a position hysteresis, and a torque hysteresis from the determined positions; determine a preliminary friction coefficient; determine preliminary form factors; determine a final friction coefficient; and determine final form factors.

BRIEF DESCRIPTION OF THE SEVERAL VIEWS OF THE DRAWINGS

Various embodiments are disclosed, by way of example only, with reference to the accompanying schematic drawings in which corresponding reference symbols indicate corresponding parts, in which.

DETAILED DESCRIPTION OF THE INVENTION

Figure 1:
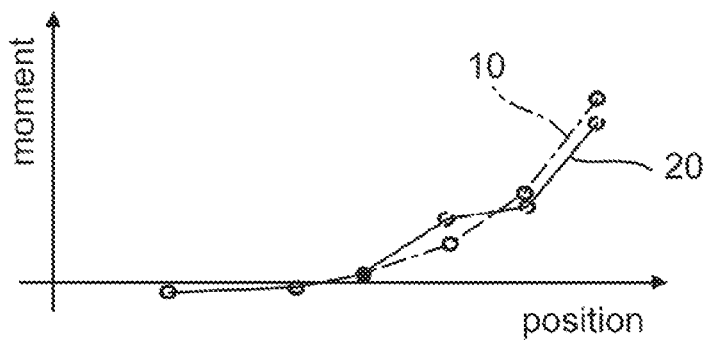
FIG. 1 illustrates the effects of the form factors (curve 20) on the nominal characteristic curve 10.
Figure 2:
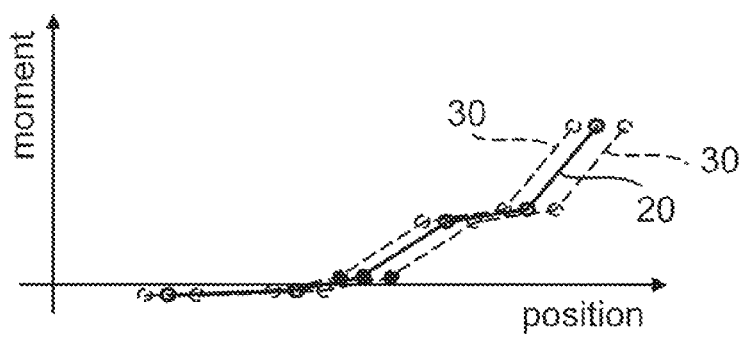
FIG. 2 illustrates the effects of the position hysteresis; for instance, the characteristic curves 30 are obtained from the modified nominal characteristic curve by parallel displacement.

The definitions of the parameters and factors noted above are applicable to the discussion that follows.

The invention is based on the object of further improve the driving comfort in particular immediately after a customer starts a new vehicle for the first time.

In accordance with the invention, clutch parameters are determined at the initial start of operation of a friction clutch in a motor vehicle. In a first phase, the clutch is moved from an open state to a closed state and to an open state again at a predetermined, constant slip of the clutch (when a torque is transmitted). When a predetermined clutch torque threshold is reached during the movement, the position of the clutch is determined and stored. In a second phase, a first step is to determine a touch point, a position hysteresis, and a torque hysteresis from the determined positions, a second step is to determine a preliminary friction coefficient, a third step is to determine preliminary form factors, a fourth step is to determine a final friction coefficient, and a fifth step is to determine final form factors.

In accordance with one embodiment, the clutch torque thresholds are distributed equidistantly across the clutch torque range provided by the clutch.

In accordance with one embodiment, the touch point is determined from a mean value of the end points of the hysteresis width for the lowest clutch torque threshold.

In accordance with a preferred embodiment, the position hysteresis is determined from the mean value of a number of hysteresis widths for low clutch torque thresholds.

In accordance with one embodiment, the torque hysteresis is determined from the mean value of a number of hysteresis widths for high clutch torque thresholds.

In accordance with one embodiment, the preliminary friction coefficient is determined from a mean value of the determined positions of the end points of the hysteresis width of the highest clutch torque thresholds.

In accordance with one embodiment of the invention, the determined touch point, the determined preliminary friction coefficient, and the nominal characteristic curve of the clutch are used to determine the scaled characteristic curve of the clutch without a form factor.

In accordance with one embodiment, the preliminary form factors are determined from the ratio of the torque values at the nodes of the scaled characteristic curve of the clutch without form factors and the associated torque values of the characteristic curve of the hysteresis centers.

In accordance with one embodiment, the final friction coefficient is determined from the preliminary friction coefficient by correction by a factor that incorporates the mean value of the preliminary form factors.

In accordance with one embodiment, the preliminary form factors are corrected by a mean value of the preliminary form factors by subtracting the determined mean value, and the resultant values are scaled by a factor in such a way that the values resulting after the scaling fulfill predetermined conditions and represent the final form factors.

In accordance with one embodiment, the predetermined conditions are that the final form factors are distributed within a range about zero and the differences between two form factors are likewise distributed within a range about zero.

The invention also proposes a device including a control unit for determining clutch parameters at an initial start of operation of a friction clutch in a motor vehicle. The control unit is provided, in a first phase, to move the clutch from an open state to a closed state and back to an open state at a predetermined, constant slip of the clutch when a torque is transmitted. During the movement, the position of the clutch is determined and stored when a predetermined clutch torque threshold is reached. In a second phase, a first step is to determine a touch point, a position hysteresis, and a torque hysteresis from the determined positions; a second step is to determine a preliminary friction coefficient; a third step is to determine preliminary form factors; a fourth step is to determine a final friction coefficient, and a fifth step is to determine final form factors.

The invention is used to determine the clutch parameters at the line end of a transmission test bench.

All clutch parameters thus need to be determined during the initial start of operation on a test bench in the best possible way to be able to store them in an EEprom memory for further use during operation.

Due to the method of the invention, a new vehicle has very good driving properties even when a customer starts to drive it for the first time.

Further advantages and advantageous embodiments of the invention will become apparent from the following figures and their descriptions, wherein By closing the clutch once on a test bench at a controlled constant slip and obtaining measured values it is possible to determine all clutch parameters listed above in an optimum way using an algorithm.

Phase 1: Determining the clutch positions for the closing and opening branch of the hysteresis curve at defined torque thresholds:

When the clutch is closed in a ramp-shaped manner by successively raising the position, the torque will inevitably increase because of the predetermined constant slip. In the process, the clutch is closed up to a maximum torque. A fixed number of equidistantly distributed torque thresholds are defined in the entire available torque range. When the measured torque exceeds the torque threshold, the associated current clutch position is stored. When the clutch is opened, a drop below the torque thresholds is used to determine the associated position.

Figure 4:
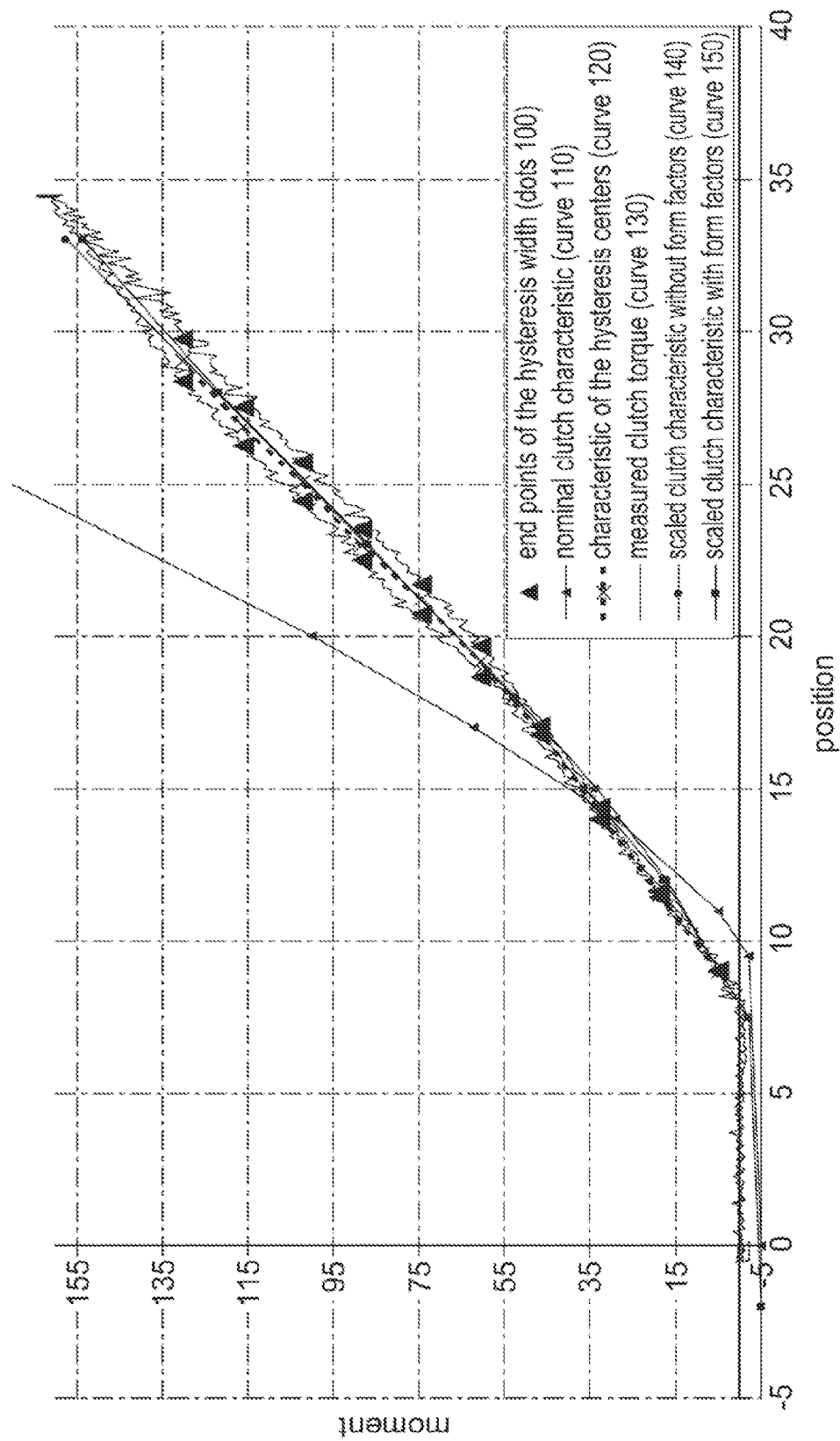

Phase 2: Evaluation of the determined clutch positions and determination of the clutch parameters:

FIG. 4 illustrates the nominal characteristic curve of the clutch (curve 110) and the measured clutch torque (curve 130). The positions associated with the torque thresholds and the end points of the hysteresis width (dots 100) are clearly marked in FIG. 4. These points are the direct result of the evaluation in Phase 1.

Step 1: Determination of the touch point, the positions hysteresis, and the torque hysteresis.

The touch point is calculated using the mean value of the end points of the hysteresis width for the lowest torque threshold. Alternatively, a number of torque thresholds in the vicinity of the touch point torque may be examined and the result may be averaged, thus rendering the result less sensitive to measuring noise.

Figure 3:
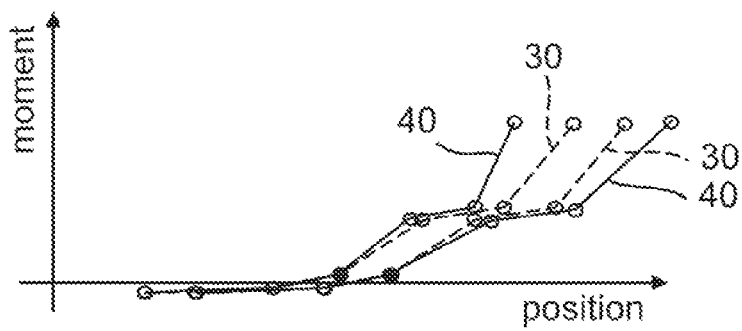
FIG. 3 illustrates the effects of the torque hysteresis; for instance, the characteristic curves 40 are obtained from the characteristic curves with position hysteresis 30; and, FIGS. 4 and 5 illustrate curves that occur when the clutch parameters are being determined.

The position hysteresis is determined from the mean value of a number of hysteresis widths in the lower torque region. Averaging again makes the determination of the parameters less sensitive to measuring noise. The selection of the torque thresholds in the lower torque region is due to the fact that the hysteresis width in the higher region may become smaller, which means that the determination of the position hysteresis will always fail due to the smallest hysteresis width. At the transition from the rising branch to the falling branch of the hysteresis the hysteresis widths in the upper region will always be smaller than in the central region. This behavior is taken into account by the control device software in the calculation of the position and torque, respectively, based on the curves represented in FIG. 3.

The torque hysteresis is determined from the mean value of a number of hysteresis widths in the higher torque region. In this context, too, the determination becomes less sensitive to measuring noise due to averaging.

Step 2: Determination of a preliminary friction coefficient.

The preliminary friction coefficient is calculated based on the mean value of the positions of the end points of the hysteresis width for the highest torque threshold. Alternatively, a number of torque thresholds in the vicinity of the highest torque threshold may be examined and an average may be taken to become less sensitive to measuring noise.

The calculated touch point and the preliminary friction coefficient can be used to calculate the scaled clutch characteristic without form factors (curve 140) from the nominal characteristic curve (curve 110). Both curves are shown in FIG. 4.

Thus, the calculated touch point and the preliminary friction coefficient can be used to modify the nominal clutch characteristic (curve 110). The touch point causes a displacement in the direction of the position and the friction coefficient causes a scaling above the touch torque.

The nominal clutch characteristic (curve 110) is compressed or expanded so as to pass through the mean value of the end points of the hysteresis width of the highest torque threshold. The friction coefficient corresponds to a scaling factor. The nominal friction coefficient may for instance amount to 270.

Step 3: Determination of the preliminary form factors.

Form factors are calculated for the torque nodes of the nominal characteristic above the touch point. These form factors result from the ratio of the torque values at the nodes of the scaled clutch characteristic without form factors and the associated torque values of the characteristic curve of the hysteresis centers (FIG. 4, curve 120).

The final form factors need to meet a number of requirements. Some of the final form factors are listed herein by way of example. It is conceivable to make further requirements to the form factors. The important fact is that during the initial start of operation routine, the form factors meet the same requirements as during the adaptation because otherwise the factors might be adapted abruptly during the first adaptation to conform to the requirements. An adaptation to find optimum form factors that would then be permitted might then take a long time and would thus have a detrimental effect on the drivability of the vehicle.

Special requirements for the final form factors:

1. The final form factors need to be distributed within a band about zero. Thus the form factors need to be limited.

2. The differences between two form factors also need to be distributed within a band about zero. This requirement is tantamount to a gradient limitation.

3. The total of the form factors without the first form factor needs to be zero. This corresponds to a correction by the mean value.

4. The first form factor is calculated from the second form factor by division in half.

First a mean value is calculated from the preliminary form factors.

Step 4: Determination of the final friction coefficient.

The preliminary friction coefficient is corrected by the mean value of the preliminary form factors by multiplying the preliminary friction coefficient by a factor. The factor incorporates the mean value of the preliminary form factors, for instance as a percentile modification.

Step 5: Determination of the final form factors.

The preliminary form factors are also corrected by the mean value of the preliminary form factors by subtracting the calculated mean value. The result is then scaled by a factor in order to meet for instance points 1 and 2 of the special requirements for the final form factors.

Figure 5:
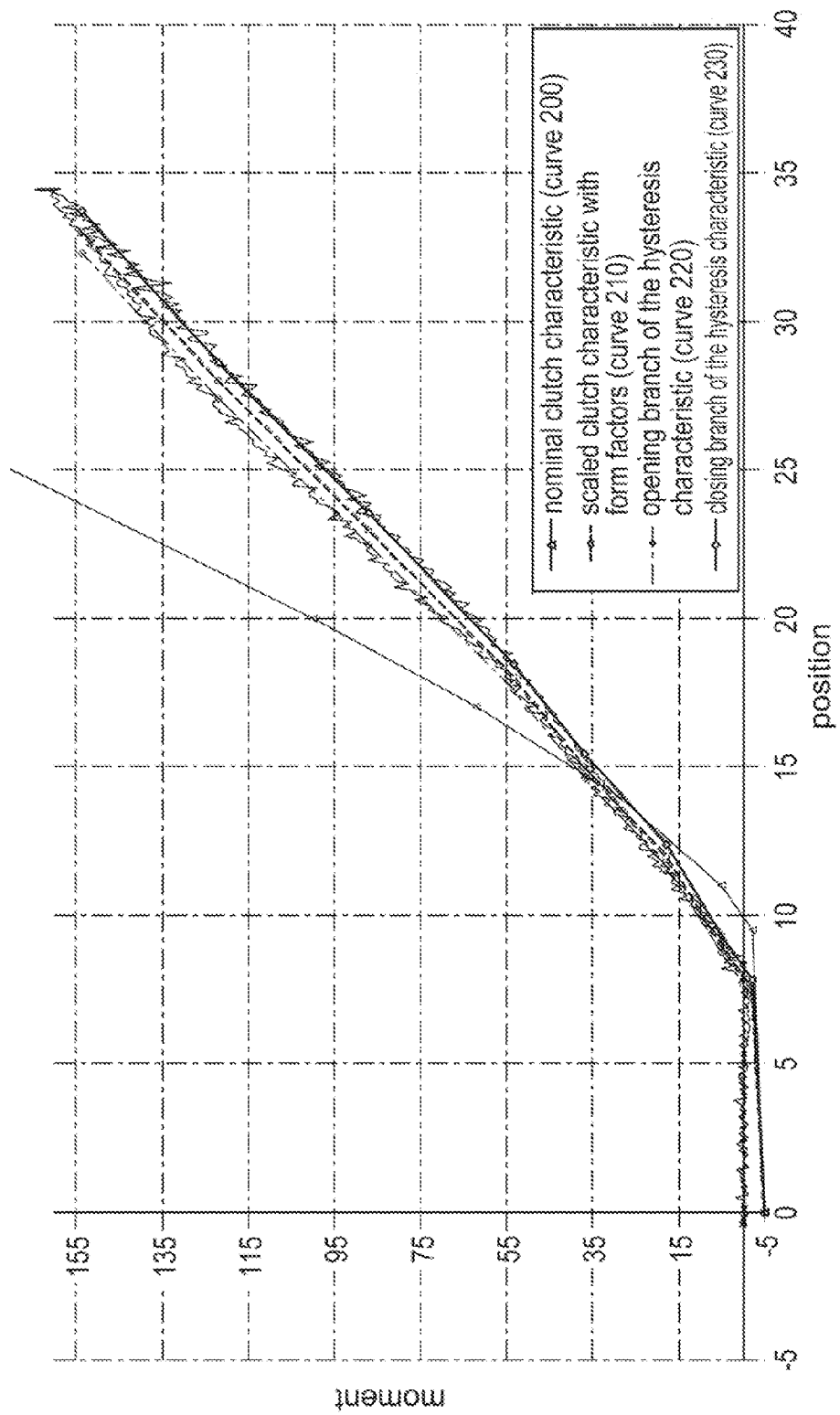

FIG. 5 illustrates the opening and closing branches of the hysteresis (curve 220, curve 230) as it results after the application of the position and torque hysteresis on the scaled clutch characteristic with form factors (curve 210).

Variations to establish the torque thresholds: Alternatively, the torque thresholds may not be distributed equidistantly across the entire range. Instead, shorter distances may be selected for the torque thresholds about the touch torque or other significant points such as the range in which the torque hysteresis is evaluated. A minimum distance can be ensured to provide a sufficient number of measurements to determine the positions.

Alternatively, the clutch characteristic may be evaluated offline on a test bench computing unit in the manner described above. The parameters may then be input into the control device using an interface.

The customer initiates a diagnostic service which causes the clutch to be closed on the test bench at a controlled constant slip. The control device software takes measurements—with the inherent problems of a limited memory and a limited lifespan—and calculates the clutch parameters for touch point, friction coefficient, position hysteresis, torque hysteresis, and form factors in accordance with the method described above. When the control device is shut down, the parameters are transferred to the EEprom memory. Consequently, for the first drive, all parameters of the clutch model are documented in an optimum way and thus give reason to expect a very smooth test drive for the customer.

LIST OF REFERENCE NUMERALS

10 nominal clutch characteristic
20 nominal characteristic modified by form factors
30 characteristic
40 characteristic
100 end points of the hysteresis width
110 nominal clutch characteristic
120 characteristic of the hysteresis centers
130 measured clutch torque
140 scaled clutch characteristic without form factors
150 scaled clutch characteristic with form factors
200 nominal clutch characteristic
210 scaled clutch characteristic with form factors
220 opening branch of the hysteresis characteristic
230 closing branch of the hysteresis characteristic

What I claim is:

1. A method of determining clutch parameters at an initial start of operation of a friction clutch in a motor vehicle comprising the steps of:
    in a first phase:
        moving, using a control unit, the clutch from an open state into a closed state and into the open state again at a predetermined constant slip of the clutch; and
        determining and storing, using the control unit, a position of the clutch during the movement when predetermined clutch torque thresholds are reached;
    in a second phase, in a first step, determining, using the control unit, a touch point, a position hysteresis, and a torque hysteresis from the determined position;
    determining, using the control unit, a preliminary friction coefficient;
    determining, using the control unit, preliminary form factors;
    determining, using the control unit, a final friction coefficient; and,
    determining, using the control unit, final form factors.

2. The method as set forth in claim 1, wherein the clutch torque thresholds are equidistantly distributed across a clutch torque range provided by the clutch.

3. The method as set forth in claim 1, further comprising:
    determining, using the control unit, the touch point from a mean value of end points of a hysteresis width for the lowest clutch torque threshold.

4. The method as set forth in claim 1, further comprising: determining, using the control unit, the position hysteresis from a mean value of a number of hysteresis widths for clutch torque thresholds within a range of first values.

5. The method as set forth in claim 4, further comprising: determining, using the control unit, the torque hysteresis from a mean value of a number of hysteresis widths for clutch torque thresholds within a range of second values greater than the first values.

6. The method as set forth in claim 1, further comprising: determining, using the control unit, the preliminary friction coefficient from a mean value of determined positions of end points of a hysteresis width of the highest clutch torque threshold.

7. The method as set forth in claim 1, further comprising: determining, using the control unit, the determined touch point, the determined preliminary friction coefficient, and a nominal clutch characteristic, a scaled clutch characteristic without form factors.

8. The method as set forth in claim 1, further comprising: determining, using the control unit, the preliminary form factors from a ratio of torque values at nodes of a scaled clutch characteristic without form factors and associated torque values of characteristic of hysteresis centers.

9. The method as set forth in claim 1, further comprising: determining, using the control unit, the final friction coefficient from the preliminary friction coefficient by correction by a factor that incorporates a mean value of the preliminary form factors.

10. The method as set forth in claim 1, further comprising: correcting, using the control unit, the preliminary form factors by a mean value of the preliminary form factors by subtracting a determined mean value; and scaling, using the control unit, values resulting from the correction of the preliminary form factors by a factor in such a way that the values resulting after scaling meet predetermined requirements and represent the final form factors.

11. The method as set forth in claim 10, wherein the predetermined requirements include that the final form factors need to be distributed within a band about zero and differences between two form factors also need to be distributed within the band about zero.

12. A device including a control device for determining clutch parameters at an initial start of operation of a friction clutch in a motor vehicle, the control device arranged to:
in a first phase, move the clutch from an open state to a closed state and back to the open state at a predetermined, constant slip of the clutch when a torque is transmitted and, during the movement, to determine and store a position of the clutch when a predetermined clutch torque threshold is reached;
in a second phase, determine:
a touch point;
a position hysteresis using a parallel displacement of a modified nominal characteristic curve in a direction of the position as a function of a speed of a clutch actuator; and
a torque hysteresis from the determined position;
determine a preliminary friction coefficient;
determine preliminary form factors;
determine a final friction coefficient; and
determine final form factors.

13. A device including a control device for determining clutch parameters at an initial start of operation of a friction clutch in a motor vehicle, the control device arranged to:
in a first phase, move the clutch from an open state to a closed state and back to the open state at a predetermined, constant slip of the clutch when a torque is transmitted and, during the movement, to determine and store a position of the clutch when a predetermined clutch torque threshold is reached;
in a second phase, determine:
a touch point;
a position hysteresis; and
a torque hysteresis from the determined position by superimposing a torque-dependent scaling to a parallel displacement of a modified nominal characteristic curve in a direction of the position;
determine a preliminary friction coefficient;
determine preliminary form factors;
determine a final friction coefficient; and
determine final form factors.

* * * * *